Nov. 2, 1965     W. B. WATKINS ETAL     3,214,896
ROTARY CUTTER BLADE
Filed Sept. 18, 1964

INVENTORS
WILLIAM B. WATKINS &
RICHARD T. CLINCH
BY
Berman, Davidson & Berman
Attorneys

United States Patent Office 3,214,896
Patented Nov. 2, 1965

3,214,896
ROTARY CUTTER BLADE
William B. Watkins, 928 W. Cotton St., Winston-Salem, N.C., and Richard T. Clinch, 4805 New Germington Road, Winston-Salem, N.C.
Filed Sept. 18, 1964, Ser. No. 397,383
3 Claims. (Cl. 56—295)

This invention relates to a rotary cutter blade, especially but not exclusively for grass cutters or mowers.

Among important objects of the invention is the provision of a blade of the kind indicated, which:

(1) Stays sharp substantially longer than ordinary blades;

(2) Has substantially more useful cutting edges than conventional blades;

(3) Requires less power for its efficient operation;

(4) Has a true cutting action, in contrast to the severance, by main force, of vegetation and fibrous material, as done by conventional blades;

(5) Cuts with a scythe action;

(6) Has a leading edge which is indented by pluralities of semi-circular hollow ground cutting edges, beveled from opposite sides of the blade, the adjacent semi-circular cutting edges being spaced by unindented portions of the leading edge, whereby the unindented portions serve to strike any obstructions before the cutting edges reach same, and protect cutting edges from damage and undue wear from such contacts;

(7) Wherein the semi-circular cutting edges of the opposed arms of the blade are staggered with respect to each other, whereby effective cutting action extends the full length of the blade, in each revolution of the blade.

Referring in detail to the drawings, there is shown a pan-shaped mower housing 10, having opposed arcuate side wall portions 12, concentric with a vertical, driven rotary blade shaft 14, on which is secured, as indicated at 16, a rotary cutter blade 18 of the invention.

Figure 1:
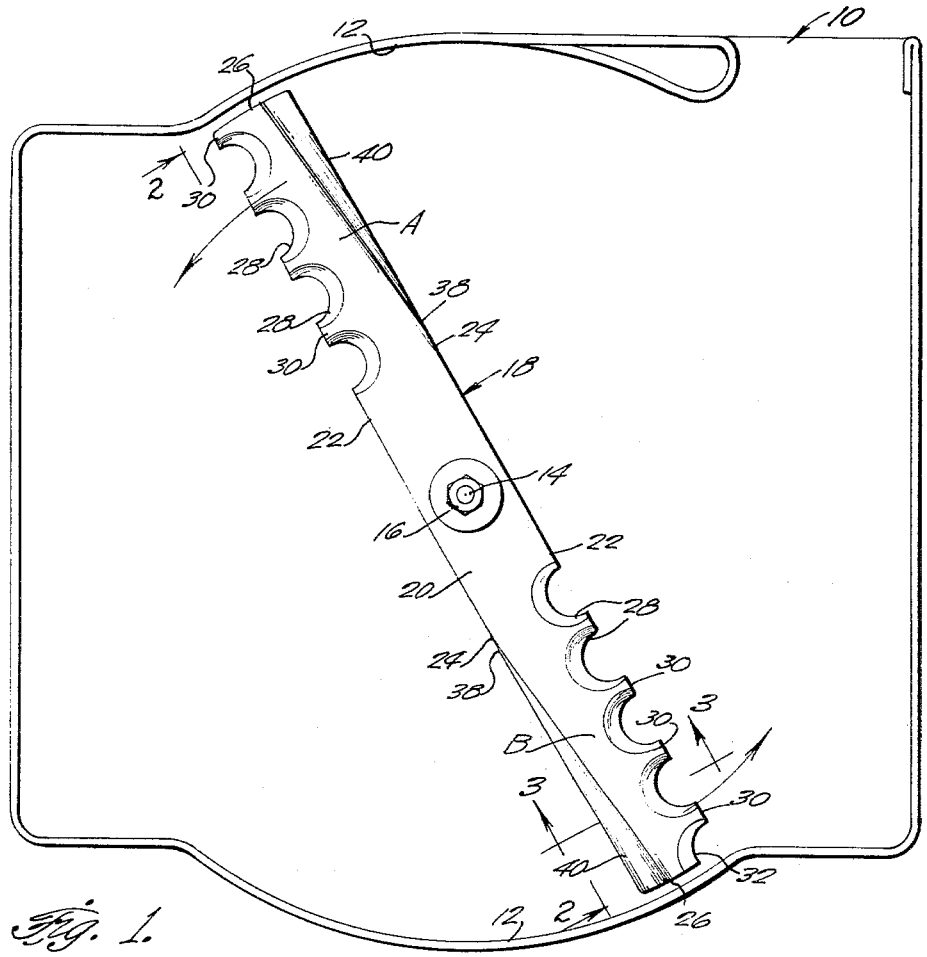
FIGURE 1 is a bottom plan view of a rotary mower, showing a blade of the present invention installed on a rotary driven shaft with the housing of the mower.

The cutter blade 18 comprises an elongated flat bar 20, having parallel leading edges 22 and trailing edges 24, and ends 26 which are arranged to move, as the blade is rotated, counterclockwise in FIGURE 1, close to the arcuate side wall portions 12 of the mower housing.

The leading edge 22 of arm A of the blade 18 is formed with a plurality, herein shown as four, semi-circular notches 28, which are equally spaced from each other, and from the adjacent end 26 of the blade, by unindented portions 30 of the leading edge. The unindented portions 30 are approximately one-third of the length of notch 28. The notches 28 of the blade arm A extend about two-thirds of the distance inwardly from the related end 26 of the arm A, so that they are spaced from the center of the blade at about one-third of the length of the arm A.

The leading edge 22 of arm B of the blade 18 is formed with a plurality of notches 28, similar to the notches of the arm A, and similar in number and spacing, which is more closely spaced from the center of the blade 18, than the notches 28, in the arm A, by half the width of a notch, the arrangement being such that the notches in the two blade arms overlap each other, so that circles drawn through the unindented portions 30 of the arm B cut through the centers of the notches of the arm A.

The leading edge 22 of the blade arm B has, in addition to the plurality of notches 30, a half-notch 32, which extends to the related end 26 of the arm B, the half-notch being separated from the outermost full notch, by an unindented portion 30.

Figure 3:
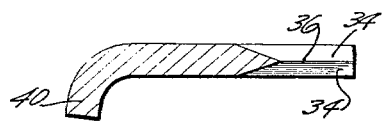

As shown in FIGURE 3, the edges of the notches 30 and the edge of the half-notch 32, are hollow ground beveled, from opposite sides of the blade arms, as indicated at 34, so as to produce semi-circular cutting edges 36, spaced equally from opposite sides of the blade 18.

Figure 2:
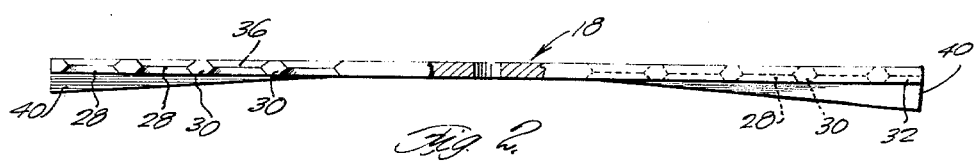
FIGURE 2 is a vertical longitudinal section taken substantially on the line 2—2 of FIGURE 1; and, FIGURE 3 is an enlarged vertical transverse section taken on the line 3—3 of FIGURE 1.

In order to provide an upward fanning action, as the blade 18 is rotated, which serves to throw cut material upwardly out of the path of the blade, the trailing edges 24 of the arms A and B, are gradiently and outwardly flared, out of the planes of the arms, from points 38, spaced about one-third of the distance outwardly from the center of the blade, to the ends of the blade, as shown in FIGURES 1 to 3, so as to define upstanding acute triangular wings 40, which flare in width to the ends of the blade.

In operation, as the blade 18 is rotated, in a counterclockwise direction, in FIGURE 1, the unindented blade portions 30 between the notches 28 and between a notch 28 and the half-notch 32, strike the standing material to be cut, and any obstructions, such as stones, ahead of the cutting edges 36 of the notches and the half-notch, so that injury to the cutting edges by contact, with such as stones, is eliminated. At the same time, the cut material, such as grass or weeds, cut by the cutting edges of one arm of the blade 18, is cut by the cutting edges of the other arm of the blade, during the same revolution of the blade.

What is claimed is:

1. A rotary cutter blade having opposed arms, said arms having opposed leading and trailing edges, the leading edges of the arms being formed with pluralities of notches, the leading edges having unindented portions spacing adjacent ones of the notches, the notches being semi-circular, the edges of the notches being beveled from the opposite sides of the arms to define semi-circular cutting edges spaced from said opposite sides, the outermost notch of one of said arms being spaced from the adjacent end of the blade, the other arm being formed with a half-notch extending between the outermost notch thereof to the adjacent end of the blade.

2. A rotary cutter blade according to claim 1, wherein portions of the trailing edges of the arms extending to the outer ends thereof are laterally deflected to define wings.

3. A rotary cutter blade having opposed arms, said arms having opposed leading and trailing edges, the leading edges of the arms being formed with pluralities of notches, the leadging edges having unindented portions spacing adjacent ones of the notches, the notches being semi-circular, the edges of the notches being beveled from the opposite sides of the arms to define semi-circular cutting edges spaced from said opposite sides, the outermost notch of one of said arms being spaced from the adjacent end of the blade, the other arm being formed with a half-notch extending between the outermost notch thereof to the adjacent end of the blade, the edge of the half-notch being beveled from the opposite sides of the related arm to define an arcuate cutting edge.

References Cited by the Examiner

UNITED STATES PATENTS

| 2,654,199 | 10/53 | Ohlendorf | 56—295 X |
| 2,751,737 | 6/56 | Herod | 56—295 |
| 3,022,621 | 2/62 | Savarella | 56—295 |

FOREIGN PATENTS 266,836   2/50   Switzerland.

ABRAHAM G. STONE, *Primary Examiner.*

RUSSELL R. KINSEY, *Examiner.*